US005712320A

United States Patent [19]
Green

[11] Patent Number: 5,712,320
[45] Date of Patent: Jan. 27, 1998

[54] LOW FOGGING POLYESTER POLYURETHANE FOAMS

[76] Inventor: Peter James Green, 28 Stanway Close, Worcester, England, WR4 9XL

[21] Appl. No.: 646,233

[22] PCT Filed: Nov. 11, 1994

[86] PCT No.: PCT/GB94/02481

§ 371 Date: Sep. 20, 1996

§ 102(e) Date: Sep. 20, 1996

[87] PCT Pub. No.: WO95/14050

PCT Pub. Date: May 26, 1995

[30] Foreign Application Priority Data

Nov. 16, 1993 [GB] United Kingdom ............ 9323603

[51] Int. Cl.$^6$ .................... C08G 18/34; C08G 18/36
[52] U.S. Cl. ........................................... 521/172; 521/173
[58] Field of Search ................................. 521/172, 173

[56] References Cited

U.S. PATENT DOCUMENTS

| 4,049,592 | 9/1977 | Marans et al. . |
| 4,605,729 | 8/1986 | Barnes et al. . |
| 5,112,940 | 5/1992 | Korte . |

FOREIGN PATENT DOCUMENTS

| 0 425 201 A | 5/1991 | European Pat. Off. . |
| 0 435 364 A | 7/1991 | European Pat. Off. . |
| 0 579 988 A1 | 1/1994 | European Pat. Off. . |
| 0 601 470 A1 | 6/1994 | European Pat. Off. . |
| 0 628 583 A | 12/1994 | European Pat. Off. . |
| 1139226 | 2/1957 | France . |
| 1139793 | 2/1957 | France . |
| 41 33 306 A1 | 4/1992 | Germany . |
| 1 294 730 A | 11/1989 | Japan . |

OTHER PUBLICATIONS

Unichema International Leaflet entitled "Dimer based polyester polyols for the polyurethane industry" Pub. May, 1991.

*Primary Examiner*—Morton Foelak
*Attorney, Agent, or Firm*—Scully, Scott, Murphy & Presser

[57] ABSTRACT

The present invention provides a polyester polyurethane foam with low fogging characteristics comprising the product of reaction of a polyester polyol and a diisocyanate wherein said polyester polyol comprises as repeating units residues of the following reactants: (i) (a) at least one hydroxy acid; or (ii) (b) at least one diacid; and (c) at least one diol or polyol; or (iii) (a) at least one hydroxy acid; (b) at least one diacid; and (c) at least one diol or polyol wherein said reactants cannot combine to provide a cyclic ester comprising a 12 to 14 member ring.

17 Claims, No Drawings

LOW FOGGING POLYESTER POLYURETHANE FOAMS

The present invention relates to polyester polyurethane foams with low fogging characteristics and methods for their manufacture.

Polyester polyurethane foams may be produced by reaction of a polyester polyol and a diisocyanate in the presence of suitable catalysts in known manner as hereinafter described. The characteristics of the resulting polyester polyurethane foam depend at least in part on those of the polyester polyol.

The polyester polyol may be a polyester comprising or consisting as repeating units residues of:

(i) (a) at least one hydroxy acid, generally an aliphatic hydrocarboxylic acid;

(ii) (b) at least one diacid, generally an aliphatic dicarboxylic acid: and (c) at least one diol or polyol, generally an aliphatic diol or polyol; or (iii) (a) at least one hydroxy acid, generally an aliphatic hydrocarboxylic acid; and (b) at least one diacid, generally an aliphatic dicarboxylic acid; and (c) at least one diol or polyol, generally an aliphatic diol or polyol The polyester polyol may be formed by reacting: (i) (a); or (ii) (b) and (c): or (iii)(a) and (b) and (c) under known conditions as further described below to produce polyesters with terminal hydroxy units. These processes are accompanied by the formation of quantities of unwanted by-products in the form of cyclic esters.

Polyester polyurethane foams are used in the production of shaped, moulded and fabric laminated articles in, for example, the car industry. For automobile applications the polyester polyol is typically diethylene glycol adipate, which may be formed by reacting in known manner adipic acid diethylene glycol and generally also a polyol, such as trimethylol propane to provide a degree of branching and cross linking. The cyclic acid by-product of an adipic acid molecule with a diethylene glycol molecule is a 13 membered ring cyclic ester. This is a waxy solid melting at around 60° C., which readily sublimes. The 13 membered cyclic ester is found in diethylene glycol adipate polyesters at about 1 to 1.1% by weight. It is known that cyclic esters may be removed by high vacuum distillation at 250° C., but readily reform at these temperatures to the equilibrium level of 1 to 1.1 weight %.

When present in polyester polyurethane foam based on diethylene glycol/adipic acid incorporated into automobile trim components such as headliners, sun visors and so forth, this volatile 13 membered ring volatilises from the polyester polyurethane foam, and subsequently deposits on, for example, the car windscreen as an oily film. This phenomenon is known as fogging.

In an effort to solve this problem, attempts have been made to seek to remove the 13 membered cyclic ester from commercial diethylene glycol polyadipate polyester polyurethane foam by passing the polyester polyol through a wipe film apparatus at 1 mm Hg and 250° C. very quickly and cooling to less than 100° C. quickly so that the cyclic ester is removed, but does not have a chance to reform.

Two dimer based polyester polyols are described in a leaflet from Unichema International dated May 1991: PRIPLAST 3191, described as a liquid, slightly branched dimer based polyester; and PRIPLAST 2038, described as a slightly branched dimer based polyester. These are said by Unichema to be mainly used for flexible foam. Flexible polyester polyurethane foams based on these polyesters are said to exhibit low fogging properties, making them suitable for automotive applications. Flexible foam formulations based on these polyesters are said to be different from the standard diethylene glycol adipate polyesters.

According to the present invention there is provided a polyester polyurethane foam with low fogging characteristics comprising the product of reaction of a polyester polyol and a diisocyanate wherein said polyester polyol comprises as repeating units residues of the following reactants:

(i) (a) at least one hydroxy acid; or (ii) (b) at least one diacid; and (c) at least one diol or polyol; or (iii) (a) at least one hydroxy acid;

(b) at least one diacid; and (c) at least one diol or polyol wherein said reactants cannot combine to provide a cyclic ester comprising a 12 to 14 member ring.

In a second aspect of the present invention there is provided a method of manufacturing a polyester polyurethane foam with low fogging characteristics comprising:

forming a polyester polyol by reacting:

(i) (a) at least one hydroxy acid; or (ii) (b) at least one diacid; and (c) at least one diol or polyol; or (iii) (a) at least one hydroxy acid;

(b) at least one diacid;

(c) at least one diol or polyol wherein said reactants are selected such that they cannot combine to provide a cyclic ester comprising a 12 to 14 member ring;

forming a polyester polyurethane foam by reacting the thus formed polyester polyol with a diisocyanate in the presence of water, catalyst and surfactant.

In a third aspect of the present invention there is provided a motor car trim component comprising a low fogging polyester polyurethane foam according to the first aspect and a method of manufacture thereof.

In the course of investigations the applicant has discovered that the 13 membered ring of the DEG/adipate product appears to be at the optimum thermodynamics for the formation of a cyclic ester. Any alteration to larger or smaller ring size reduces the amount of cyclic ester. For example with a polybutylene glycol/adipic acid combination, which will form a 12 membered ring by-product, the cyclic ester equilibrium is 0.35 weight % compared with the diethylene glycol adipate where the cyclic ester equilibrium is 1 to 1.1 weight %. A 16 membered ring or more and a 10 membered ring or below has been found to have such a low equilibrium amount of cyclic ester that the cyclic ester does not cause significant fogging.

For example succinic acid/diethylene glycol (11 membered cyclic ester); adipic acid/ethylene glycol (10 member cyclic ester) and dodecanedioic acid/diethylene glycol (19 member cyclic ester) have cyclic ester contents approaching zero and produce polyester polyurethane foam which Goes not cause significant fogging on the windscreen of a car. Foams made from these three exemplified esters, while being non-fogging, give essentially different physical properties to that of DEG/adipate. It has been found, however, that by blending polyethylene glycol and ethylene glycol in appropriate ratios, the physical properties of the polyester polyurethane foam based on an adipate polyester polyol can be made to approximate those of a foam based on diethylene glycol adipate, but the foam produces negligible fogging on the windscreen.

To provide polyester polyols for use in preparing the polyurethane foam of the present invention, suitable combinations of:

(i) (a) at least one hydroxy acid; or (ii) (b) at least one diacid; and (c) at least one polyol or diol; or (iii) (a) at least one hydroxy acid;

(b) at least one diacid: and (c) at least one diol or polyol are selected to ensure that cyclic esters are not formed with 12 to 14 member rings and preferably are not formed with 11 to 15 member rings. Suitable components include:

(i) and (iii)

(a) is preferably an aliphatic hydroxycarboxylic acid, more preferably a $C_7$ or longer hydroxy-straight chain aliphatic carboxylic acid;

(ii) and (iii)

(b) is preferably a dicarboxylic acid, more preferably an aliphatic dicarboxylic acid such as a dimer acid or more preferably a straight chain aliphatic dicarboxylic acid such as succinic acid, adipic acid, azelaic or dodecanedioic acid;

(c) is preferably an aliphatic diol or polyol, preferably a poly($C_{1-4}$) alkylene glycol especially polyethylene glycol, poly-1-methylethylene glycol or polypropylene glycol.

Suitable combinations may include the following

| (b) | (c) | ring number |
| --- | --- | --- |
| succinic acid | diethylene glycol | 11 |
| adipic acid | ethylene glycol | 10 |
| adipic acid | pentaerythritol | 11 |
| adipic acid | polyethylene glycol 200 | 19 |
| azelaic acid | pentaerythritol | 14 |
| azelaic acid | diethylene glycol | 16 |
| dodecanedioic acid | diethylene glycol | 19 |
| dimer acid | polyethylene glycol 400 | 25 or above |

A polyethylene glycol $HO(CH_2 CH_2 O)_n H$ will combine with adipic acid to produce a cyclic ester of ring size $3n+7$, which will thus meet the requirements of the present invention for $n \geq 3$. By blending polyethylene glycol and ethylene glycol and reacting the blend with adipic acid, and preferably a suitable polyol to provide the required degree of branching and cross linking, such as pentaerythritol, thereby to produce a polyester polyol, it is possible to produce a polyester polyurethane foam based on that polyester polyol which has physical properties approximating to those of the conventional diethylene glycol/adipate based polyester polyurethane foam. A preferred blend is a blend of polyethylene glycol 200 and ethylene glycol in the ratio of from 4:1 to 2:1 parts by weight, preferably 7:2 to 3:1 parts by weight, more preferably 720 to 730 parts by weight of polyethylene glycol to 225 parts by weight of ethylene glycol.

It will be appreciated that other combinations may be selected providing that the reactants do not produce cyclic esters with ring sizes within the excluded range.

The selected reactants may be reacted in known manner by a chemically catalysed reaction at elevated temperature with removal of water. Alternatively, they may be reacted by an enzymatic polyester polymerisation process as described in our co-pending applications 92/25054.7 and 92/25030.7, that is to say reaction in the presence of a lipase in the presence or absence of an organic solvent.

The reactive carboxylic acid groups and reactive hydroxy groups of the reactants are generally present in substantially equal numbers or with a slight excess of hydroxy groups to provide a hydroxy-terminated polyester (a polyester polyol). Preferably the acid groups and hydroxyl groups are present in a molar ratio of 1:1 to 1:1.1.

The resultant polyester polyol may be converted to a polyurethane foam in known manner by mixing with a diisocyanate, water, which reacts with the diisocyanate generating carbon dioxide to produce a foam, suitable catalysts, and one or more surfactants to control the cell structure of the foam. Optionally, flame retardants may be included.

A suitable diisocyanate is toluene diisocyanate, which may consist of a blend of isomers, typically 80/20 2,4-toluene diisocyanate/2,6-toluene diisocyanate or 65/35 2,4-toluene diisocyanate/2,6-toluene diisocyanate. The known catalysts include amine type catalysts such as n-ethyl morpholine, dimethyl benzylamine, dimethyl cetylamine, dimethylcyclohexylamine. Additionally organo-metallic catalysts, such as stannous octoate, may be used as co-catalysts.

The types and amounts of catalysts are selected in known manner to balance the reactions that take place between the polyol and the isocyanate and between the water and the isocyanate. Surfactants, which may for example be organic or silicone based such as Fomrez M66-86A (Witco) and L532 (Union Carbide) may be used to stabilise the cell structure, to act as emulsifiers and to assist in mixing. Where the polyester polyurethane foam is required to be flame retarded, flame retardants, for example flame retardants of the chlorinated phosphate type such as tris 1,3-dichloropropylphosphate and tris monochloro isopropyl phosphate, may be incorporated.

The polyester polyurethane foams of the present invention find use in the manufacture of shaped and moulded articles, and fabric laminated articles, particularly for use in motor vehicles. The polyurethane foams of the present invention have low fogging characteristics showing essentially no fogging. These foams preferably have a fogging value F not less than about 70% reflectance and preferably approaching 100% reflectance when measured in accordance with Fogging Characteristics Din 75-201-A. Polyester polyurethane foams according to the present invention may find application in other areas where low levels of volatile components, in particular cyclic esters, are desirable, The following examples illustrate the invention and are not intended to limit the scope thereof.

EXAMPLE 1

A round bottom flask equipped with a stirrer, thermometer, condenser and nitrogen inlet tube was charged with 3300 parts of azelaic acid, 74.9 parts of pentaerythritol and 1975 parts of diethylene glycol. The minute was heated in a current of nitrogen to a temperature of 225° C., water of reaction starting to distil out at about 150° C. The reaction as continued at 225° C. until an acid number of less than 2 was achieved. About 4718 parts of a product was obtained having a hydroxyl number of 53 and a viscosity of about 19,000 cps at 25° C.

EXAMPLE 2

This example incorporates a dimer acid. Typically these dimer acids contain mixtures of C18 monomer, dimer and trimer acids. Preferably the dimer acids content should be at least 70%. Examples of suitable commercial dimer acids include Unidyme 18 (Union Camp Chemicals Ltd.), Pripol 1017 (Unichema) and Empol 1018 (Henkel) etc.

A round bottom flask equipped with a stirrer, thermometer, condenser and nitrogen inlet tube was charged with 4000 parts of Unidyme 18 dimer acid, 19.4 parts of pentaerythritol, 545.1 parts of polyethylene glycol 400 and 807.6 parts of diethylene glycol. The mixture was heated in a current of nitrogen to a temperature of 225° C., water of reaction starting to distil out at about 150° C. The reaction was continued at 225° C. until an acid number of less than 2 was achieved. About 5123 parts of a product was obtained having a hydroxyl number of 53 and a viscosity of about 19,000 cps at 25° C.

EXAMPLE 3

A round bottom flask equipped with a stirrer, thermometer, condenser and nitrogen inlet tube was charged with 2700 parts of adipic acid, 74.5 parts of pentaerythritol, 605.2 parts of monoethylene glycol and 1952.7 parts of polyethylene glycol 200. The mixture was heated in a current of nitrogen to a temperature of 225° C., water of reaction starting to distil out at about 150° C. The reaction was continued at 225° C. until an acid number of less than 2 was achieved. About 4668 parts of a product was obtained having a hydroxyl number of 53 and a viscosity of about 19,000 cps at 25° C.

EXAMPLE 4 (EXAMPLE FOR COMPARISON)

A round bottom flask equipped with a stirrer, thermometer, condenser and nitrogen inlet tube was charged with 2900 parts of adipic acid, 117.5 parts of trimethylol propane and 2185 parts of diethylene glycol. The mixture was heated in a current of nitrogen to a temperature of 225° C., water of reaction starting to distil out at about 150° C. The reaction was continued at 225° C. until an acid number of less than 2 was achieved. About 4487 parts of a product was obtained having a hydroxyl number of 53 and a viscosity of about 19,000 cps at 25° C.

EXAMPLE 5

A comparison of polyester polyurethane foams formulated from polyester polyols of Examples 1 to 4 by reaction with 80/20 toluene diisocyanate shows the following properties. Polyester polyurethane foams based on the polyester polyols of Examples 1 to 3 provide good results (high percentage reflection values) when subjected to the test method of DIN 75.201-A "Determination of the windscreen fogging characteristics of trim materials in motor vehicles—Reflectance Method". Polyester polyurethane foams based on Example 4 (standard polyethylene glycol adipate foams) produce poor results (low percentage reflection value) when subjected to the same test method. The physical properties of polyurethane foam based on the polyester polyol of Example 3, a polyethylene glycol/monoethylene glycol/adipic acid derived polyester polyol are similar to the standard diethylene glycol/adipic acid derived polyester polyurethane foam based on the polyester polyol of Example 5, but the Example 3 based foam has improved fogging properties.

EXAMPLE 6

A round bottom flask equipped with a stirrer, thermometer, condenser and nitrogen inlet tube was charged with 3000 parts of adipic acid, 87.3 parts of pentaerythritol, 667 parts of monoethylene glycol and 2152 parts of tetraethylene glycol. The mixture was heated in a current of nitrogen to a temperature of 225° C., water of reaction starting to distil out at about 150° C. The reaction was continued at 225° C. until an acid number of less than 2 was achieved. About 4866 parts of a product were obtained having a hydroxyl number of 54 and a viscosity of about 17,000 cps at 25° C.

EXAMPLE 7

A round bottom flask equipped with a stirrer, thermometer, condenser and nitrogen inlet tube was charged with 3000 parts of adipic acid, 67.5 parts of pentaerythritol, 667.5 parts of monoethylene glycol and 1615.5 parts of triethylene glycol. The mixture was heated in a current of nitrogen to a temperature of 225° C., water of reaction starting to distil out at about 150° C. The reaction was continued at 225° C. until an acid number of less than 2 was achieved. About 4345 parts of a product were obtained having a hydroxyl number of 51 and a viscosity of about 20,800 cps at 25° C.

I claim:

1. A polyester polyurethane foam with low fogging characteristics comprising the product of reaction of a polyester polyol and a diisocyanate wherein said polyester polyol consists essentially of, as repeating units, residues of the following reactants:

I (b) adipic acid and optionally at least one diacid other than adipic acid;

(c) at least one diol or polyol; and (d) pentaerythritol; or

II (a) at least one hydroxy acid;

(b) at least one diacid; and (c) at least one diol or polyol wherein said reactants cannot combine to provide a cyclic ester comprising a 12 to 14 member ring.

2. A polyester polyurethane foam according to claim 1 wherein the reactants cannot combine to provide a cyclic ester comprising a 11 to 15 member ring.

3. A polyester polyurethane foam according to claim 1 or claim 2 wherein the or a said hydroxy acid is a hydroxy-carboxylic acid.

4. A polyester polyurethane foam according to claim 3 therein said hydroxy acid is an aliphatic hydroxycarboxylic acid.

5. A polyester polyurethane foam according to claim 4 wherein said hydroxy acid is $C_7$ or longer hydroxy straight chain aliphatic carboxylic acid.

6. A polyester polyurethane foam according to claim 1 wherein the or a said diacid is a dicarboxylic acid.

7. A polyester polyurethane foam according to claim 6 wherein said diacid is an aliphatic dicarboxylic acid.

8. A polyester polyurethane foam according to claim 7 wherein said diacid is selected from adipic acid, succinic acid, azelaic acid and dodecanedioic acid.

9. A polyester polyurethane foam according to any one of the preceding claims wherein the or a said diol or the or a said polyol is an aliphatic diol or aliphatic polyol.

10. A polyester polyurethane foam according to claim 9 wherein said diol is a poly($C_{1-4}$) alkylene glycol.

11. A polyester polyurethane foam according to claim 10 wherein said diol is polyethylene glycol, poly-1-methyl ethylene glycol or polypropylene glycol.

12. A polyester polyurethane foam according to claim 1 wherein
(b) is adipic acid; and
(c) is a blend of polyethylene glycol and ethylene glycol.

13. A polyester polyurethane foam according to claim 12 wherein (c) is a blend of polyethylene glycol 200 and ethylene glycol in the weight ratio 2 to 4 parts of polyethylene glycol to 1 part of ethylene glycol.

14. A polyester polyurethane foam according to claim 12 or claim 13 wherein the polyethylene glycol/ethylene glycol blend is selected to provide a polyester polyurethane foam with physical characteristics approximating to those of a diethylene glycol/adipic acid based foam.

15. A method of manufacturing a polyester polyurethane foam with low fogging characteristics comprising:

forming a polyester polyol by reacting:

I (b) adipic acid and optionally at least one diacid other than adipic acid;

(c) at least one diol or polyol; and
(d) pentaerythritol; or

II (a) at least one hydroxy acid;
(b) at least one diacid;
(c) at least one diol or polyol wherein said reactants are selected such that they cannot combine to provide a cyclic ester comprising a 12 to 14 member ring;

forming a polyester polyurethane foam by reacting the thus formed polyester polyol with a diisocyanate in the presence of water, catalyst and surfactant.

16. A method of manufacturing a motor car trim component comprising claim 15 the further step of forming said automobile trim component from said polyester polyurethane foams.

17. An automobile trim component comprising a polyester polyurethane foam according to claim 1.

* * * * *

UNITED STATES PATENT AND TRADEMARK OFFICE
CERTIFICATE OF CORRECTION

PATENT NO. : 5,712,320
DATED : January 27, 1998
INVENTOR(S) : Peter J. Green

It is certified that error appears in the above-identified patent and that said Letters Patent is hereby corrected as shown below:

Column 2, line 60: "Goes" should read --does--

Column 3, line 38: "acId" should read --acid--

Column 4, line 57: "minute" should read --mixture--

Column 4, line 60: "as" should read --was--

Column 6, line 47, Claim 4: "therein" should read --wherein--

Column 6, lines 59-60, Claim 9: "according to any one of preceding claims" should read --according to claim 1--

Signed and Sealed this

Twenty-fifth Day of January, 2000

Attest:

Attesting Officer

Acting Commissioner of Patents and Trademarks